(12) United States Patent
Tejada (10) Patent No.: US 12,174,128 B2
(45) Date of Patent: Dec. 24, 2024

(54) HIGH RESOLUTION MULTISPECTRAL MULTI-FIELD-OF-VIEW IMAGING SYSTEM FOR WAFER INSPECTION

(71) Applicant: Onto Innovation Inc., Wilmington, MA (US)

(72) Inventor: John A Tejada, Londonderry, NH (US)

(73) Assignee: Onto Innovation Inc., Wilmington, MA (US)

( * ) Notice: Subject to any disclaimer, the term of this patent is extended or adjusted under 35 U.S.C. 154(b) by 89 days.

(21) Appl. No.: 17/930,606

(22) Filed: Sep. 8, 2022

(65) Prior Publication Data

US 2023/0075747 A1  Mar. 9, 2023

Related U.S. Application Data

(60) Provisional application No. 63/242,354, filed on Sep. 9, 2021.

(51) Int. Cl.
*G01N 21/95* (2006.01)
*G01J 3/28* (2006.01)
*G01N 21/64* (2006.01)
*G01N 21/88* (2006.01)

(52) U.S. Cl.
CPC ........ *G01N 21/9501* (2013.01); *G01J 3/2823* (2013.01); *G01N 21/6458* (2013.01); *G01N 21/8806* (2013.01)

(58) Field of Classification Search
CPC ........... G01N 21/9501; G01N 21/6458; G01N 21/8806; G01N 21/8851; G01J 3/2823
See application file for complete search history.

(56) References Cited

U.S. PATENT DOCUMENTS

| | | | |
|---|---|---|---|
| 6,444,992 B1 | 9/2002 | Kauvar et al. | |
| 9,128,036 B2 | 9/2015 | Holmes | |
| 9,772,289 B2* | 9/2017 | Sappey | G01N 21/9501 |
| 10,845,581 B2* | 11/2020 | Maeda | G03B 21/28 |
| 11,821,830 B2* | 11/2023 | Ilkov | G01N 15/1434 |
| 11,860,091 B2* | 1/2024 | Kavosh | B23K 26/0622 |

(Continued)

FOREIGN PATENT DOCUMENTS

| | | |
|---|---|---|
| JP | 2014508955 A | 4/2014 |
| KR | 20150012243 A | 2/2015 |

(Continued)

OTHER PUBLICATIONS

"Taiwanese Application Serial No. 111134304, Office Action mailed May 3, 2023", with Concise Statement of Relevance.

(Continued)

*Primary Examiner* — Hung V Nguyen (74) *Attorney, Agent, or Firm* — Schwegman Lundberg & Woessner, P.A.

(57) ABSTRACT

An optical system and design can image objects under inspection in the ultraviolet (UV) and visible spectrums. This imaging can be used to detect both large defects in the visible spectrum and small defects in the UV spectrum in a single pass while reducing the time and cost of the inspection process. The optical system may include an off-axis reflective focusing system for aberration correction with a beamsplitter to separate the visible spectrum from the UV wavelengths. Cameras may then image visible and UV wavelengths.

20 Claims, 5 Drawing Sheets

(56) References Cited

U.S. PATENT DOCUMENTS

2014/0001370 A1    1/2014   Chuang et al.
2015/0043003 A1    2/2015   Chung et al.
2016/0377548 A1   12/2016   Sappey

FOREIGN PATENT DOCUMENTS

TW       201823713        7/2018
TW       202311727 A      3/2023
WO     2023039471 A1      3/2023

OTHER PUBLICATIONS

"International Application Serial No. PCT/US2022/076111, International Search Report mailed Dec. 27, 2022", 3 pgs.
"International Application Serial No. PCT/US2022/076111, Written Opinion mailed Dec. 27, 2022", 5 pgs.
"Taiwanese Application Serial No. 111134304, Response filed Nov. 6, 2023 to Office Action mailed May 3, 2023", with English claims, 12 pages.
"International Application Serial No. PCT US2022 076111, International Preliminary Report on Patentability mailed Mar. 21, 2024", 7 pages.

* cited by examiner

HIGH RESOLUTION MULTISPECTRAL MULTI-FIELD-OF-VIEW IMAGING SYSTEM FOR WAFER INSPECTION

CROSS-REFERENCE TO RELATED APPLICATION

This application claims the benefit of priority to U.S. Provisional Patent Application Ser. No. 63/242,354 filed Sep. 9, 2021, the contents of which are incorporated herein by reference in its entirety.

TECHNICAL FIELD

The present disclosure generally relates to imaging systems, in particular high resolution multispectral, multi-field-of view imaging systems for inspection applications.

BACKGROUND

High-resolution optical systems can used for various inspection applications. One of the more demanding applications is wafer inspection of two-dimensional (length and width) deposition features created during the manufacturing process. The deposition process can lead to defects and the ability to detect these defects quickly and efficiently can minimize cost. Large deposition defects have been traditionally detected using visible wavelengths, which exploit color. However, advances in lithographic deposition technology have reduced the dimensions of deposition defects beyond that which can be readily detectable using visible wavelengths. Hence, the use of ultraviolet wavelengths to detect these smaller defects has gained traction.

A mix of these smaller defects and larger defects are present in a typical wafer. But most inspection processes are ill-equipped to handle detection of small and large defects. For example, multiple passes using the same tool with different attributes, or completely different tools can be used to find the various defects on the wafers. This can be a costly and time-consuming technique.

SUMMARY

The inventor recognized, among other things, a need for an optical system and design that can image in the ultraviolet (UV) and visible spectrums. This imaging can be used to detect both large defects in the visible spectrum and small defects in the UV spectrum in a single pass while reducing the time and cost of the inspection process. The optical system may include an off-axis reflective focusing system for aberration correction with a beamsplitter to separate the visible spectrum from the UV wavelengths. Cameras may then image visible and UV wavelengths. In some examples, images created from the visible and UV wavelengths may be fused together to create a combined image in both the visible and UV spectrum.

This disclosure describes an optical system for inspection of a substrate. The optical system may include a microscope objective and an off-axis reflective focusing system including a primary mirror with positive power to receive light beams from the microscope objective, a secondary mirror with negative power to receive converged light beams from the primary mirror, and a tertiary mirror with a positive power to receive redirected light beams from the secondary mirror. The optical system includes a beamsplitter to receive a light from the off-axis reflective focusing system and to separate the light into a first spectrum and a second spectrum, a first detector to generate a first image of the substrate based on the first spectrum, and a second detector to generate a second image of the substrate based on the second spectrum.

This disclosure also describes a method to generate images for inspecting a substrate, the method comprising: projecting a telecentric image of the substrate using an off-axis reflective focusing system including a primary mirror, a secondary mirror, and a tertiary mirror; separating the telecentric image into a visible spectrum and an ultraviolet spectrum; generating a first image based on the visible spectrum; and generating a second image based on the ultraviolet spectrum.

This disclosure further describes an inspection apparatus to capture images of defects on a substrate. The inspection apparatus may include an off-axis mirror based reflective focusing system with a plurality of mirrors; an objective lens to receive a light from the substrate and send the light into off-axis mirror based reflective system; a beamsplitter to receive a reflected light from the off-axis mirror based reflective focusing system and to separate the reflected light into a first spectrum and a second spectrum; and a first camera to receive the first spectrum of the reflected light from the beamsplitter and to image the defects on the substrate.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods for efficiently detecting different types of defects during inspection are described. Defects can be detected in multiple spectrums using optical systems with off-axis reflective focusing systems. In some examples, images from different spectrums can be fused to generate composite images.

Figure 1:
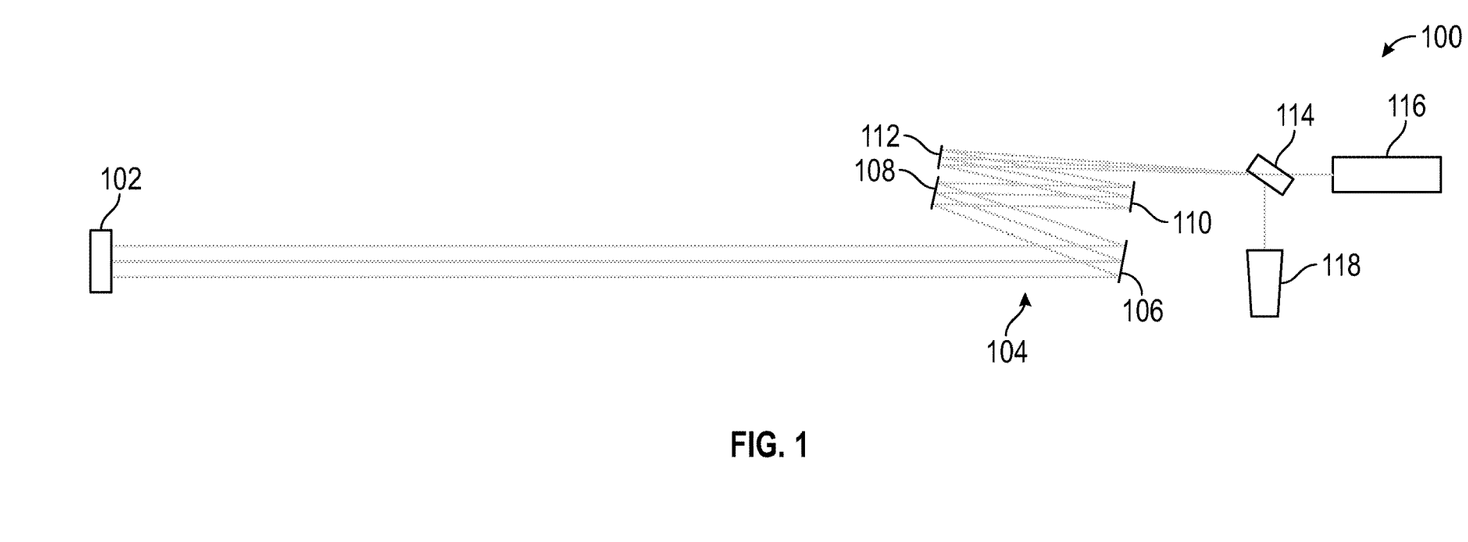
FIG. 1 illustrates example portions of an optical system.

FIG. 1 illustrates example portions of an optical system 100. The optical system 100 may be mounted in a microscope used for substrate inspection, such as for wafers and other semiconductor devices. The optical system 100 may include a microscope objective 102; an off-axis reflective focusing system 104 including a primary mirror 106, a secondary mirror 108, and a tertiary mirror 110; a fold mirror 112; a beamsplitter 114; a visible-spectrum channel 116; and a UV (or deep ultraviolet (DUV)) channel 118.

The microscope objective 102 may include optical lenses and other optical components to provide a fixed magnification. The microscope objective 102 may be selectable from a plurality of objectives to achieve different magnifications. The microscope objective 102 may include an aperture stop. The aperture stop is located on the back of the microscope objective 102.

The light from the microscope objective 102 is collected by the primary mirror 106 with positive power and is focused and redirected to the secondary mirror 108. The primary mirror 106 is positioned off-axis to avoid obscuring the beams from the components downstream, as described in further detail below. The primary mirror 106 may be provided as a concave surface to converge the light rays to the secondary mirror 108.

The secondary mirror 108 with negative power redirects the beam to the tertiary mirror 110. The secondary mirror 108 may be provided as a convex mirror to redirect the light rays and to compensate for image aberrations. The position of the secondary mirror 108 may be adjustable. The position of the secondary mirror 108 may be calibrated for compensating aberrations, such as blurs at either image plane.

The tertiary mirror 110 may be a positive power mirror to direct the beams to the fold mirror 112. In some examples, the tertiary mirror 110 may be provided on the same mirror surface as the primary mirror 106, but a different location on a common mirror surface, e.g., different parts of the aperture of the common mirror surface (also called a parent mirror). The tertiary mirror 110 may have the same positive power and surface definition as the primary mirror 106 so they can be produced on a single surface. The tertiary mirror 110 redirects the light to a fold mirror 112.

The off-axis reflective focusing system 104, which includes the primary mirror 106, the secondary mirror 108, and the tertiary mirror 110, may maintain telecentricity. For example, a telecentric image may have all chief rays substantially parallel to an optical axis.

The fold mirror 112 directs the energy to the beamsplitter 114. The beamsplitter 114 separates the visible energy from the UV (or DUV) energy into separate channels: the visible-spectrum channel 116 and the UV (or DUV) channel 118. The beamsplitter 114 may be provided as an optical component, such as a plate, to split the incident light into the two spectrums.

The visible-spectrum channel 116 may include lenses and other optical components to magnify and focus the beams and a detector to form a visible-channel image. The detector can be camera provided as an image sensor with an array of pixel components used to create the final image of the visible channel (e.g., CMOS image sensor, camera, etc.).

The UV (or DUV) channel 118 may include lenses and other optical components to magnify and focus the beams and a detector to form a UV-channel image. The detector can be camera provided as an image sensor with an array of pixel components used to create the final image of the UV channel (e.g., CMOS image sensor, camera, etc.).

The visible-channel and UV-channel images may be generated substantially simultaneously to detect large and small defects, respectively, in a single pass. The visible-channel image may be used to detect large defects while the UV-channel image may be used to detect smaller defects. In some examples, the visible-channel and DUV-channel images may be fused together to generate a composite image in both spectrums. A processor may be provided to receive the visible-channel and DUV-channel images and to combine the images to generate the composite image.

The off-axis reflective focusing system 104 (with the microscope objective 102) projects a telecentric image onto the detectors in the visible and UV channels. Providing this telecentricity offers advantages of being able to move the respective images to adjust the focus by the off-axis reflective focusing system without changing the height of the detectors in the respective channels.

Figure 2:
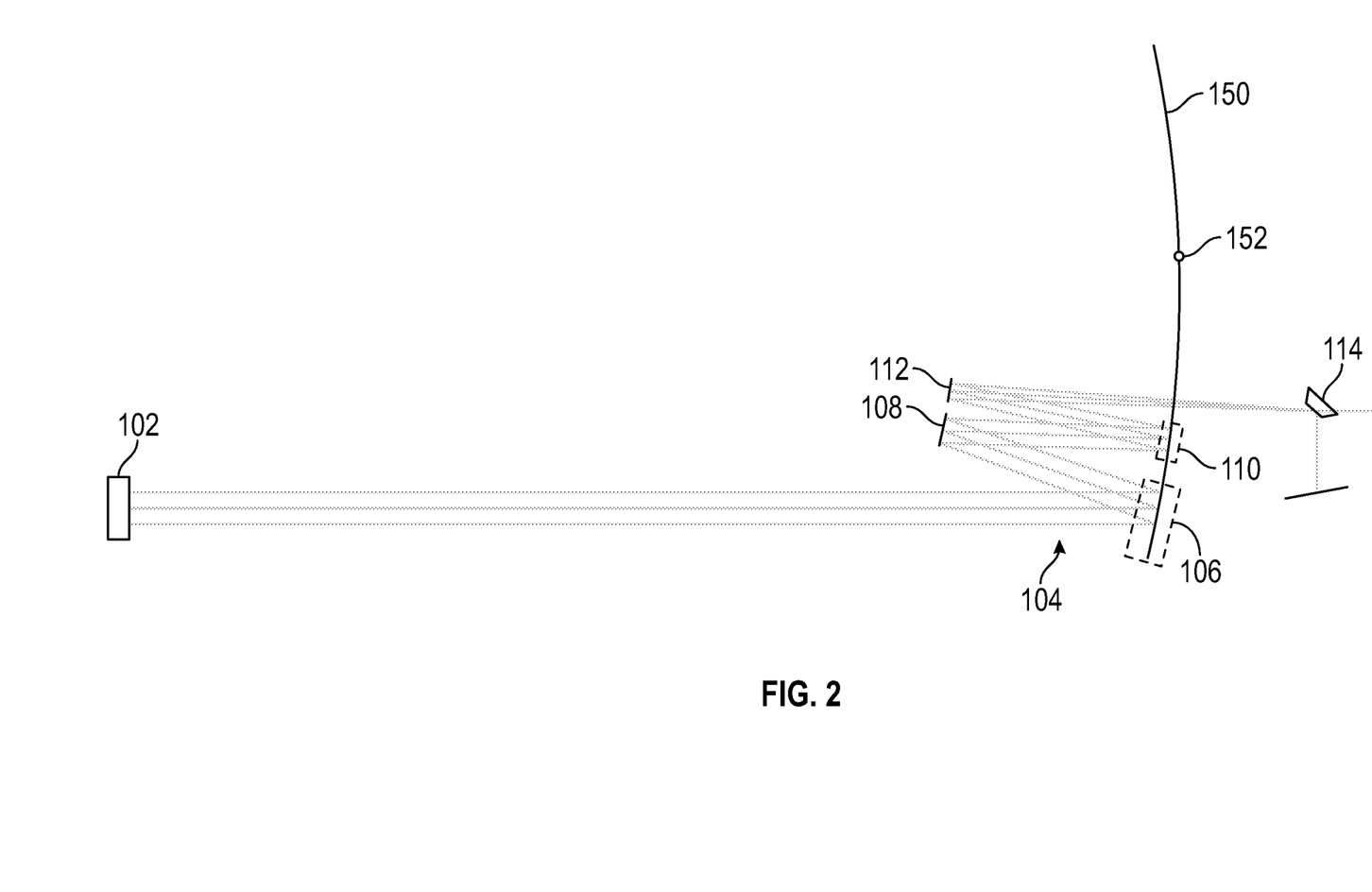
FIG. 2 illustrates example portions of a parent mirror.
Figures 3, 4:
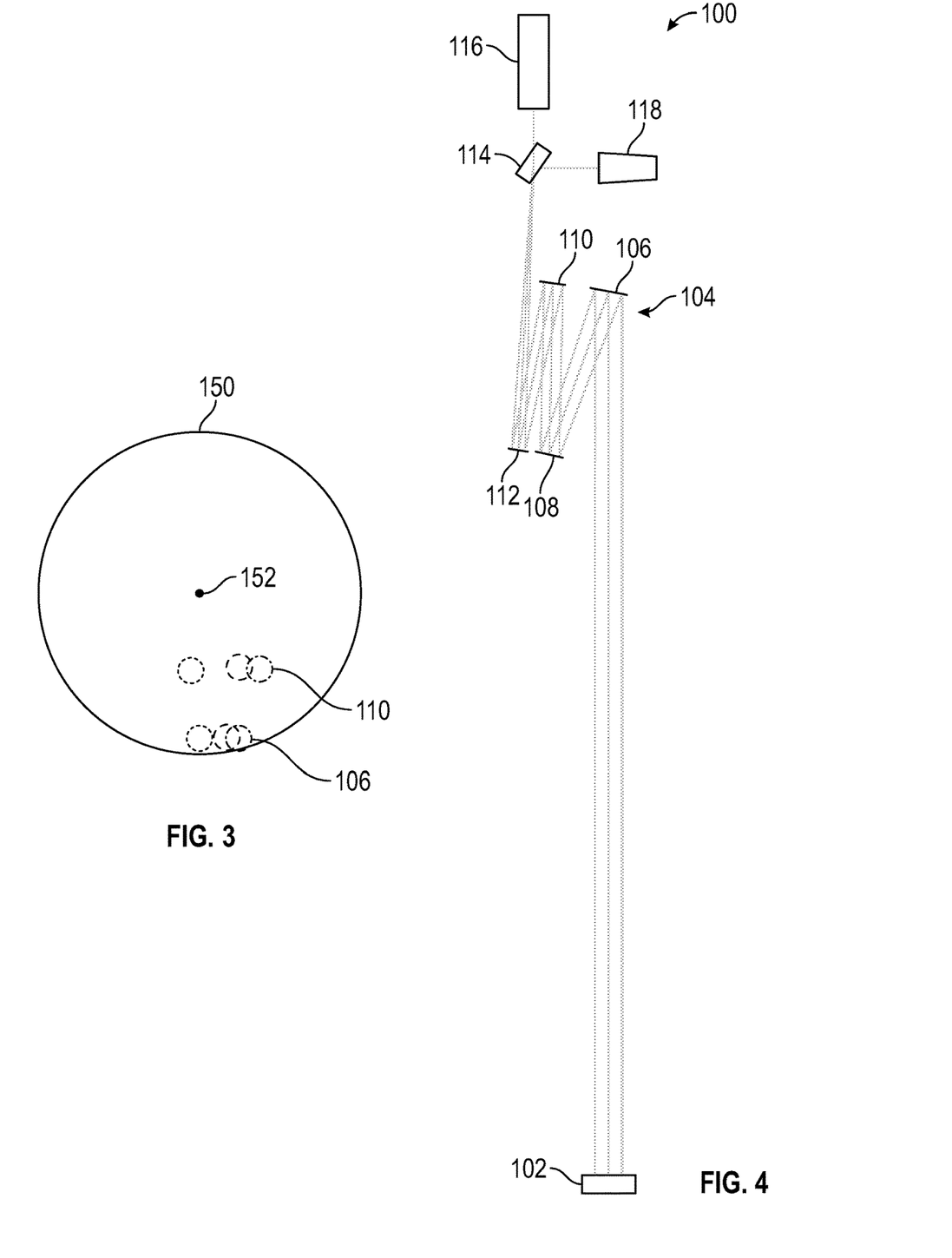
FIG. 3 illustrates a footprint of the parent mirror.
FIG. 4 illustrates example portions of an optical system in a vertically mounted orientation.

FIG. 2 illustrates example portions of a parent mirror 150 with a common surface 152 for the primary mirror 106 and tertiary mirror 110. FIG. 3 illustrates a footprint of the parent mirror 150. The primary mirror 106 and tertiary mirror 110 are provided at different off-axis locations of the common surface 152 of the parent mirror 150. The locations of the primary mirror 106 and the tertiary mirror 110 on the common surface are off-vertex of the common surface 152. Moreover, the location of the primary mirror 106 may be further from the vertex of the common surface than the tertiary mirror 110.

Figure 5:
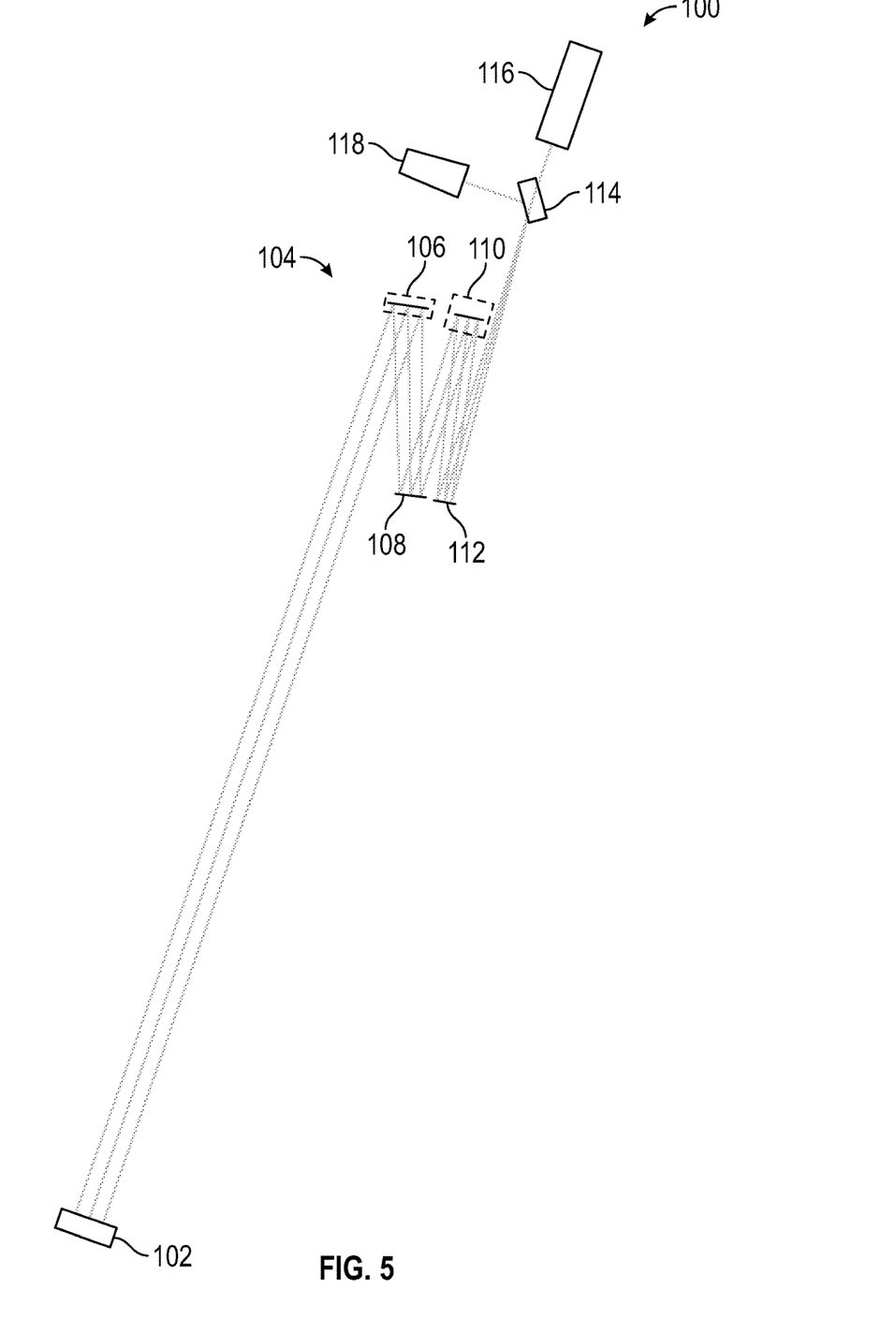
FIG. 5 shows an isometric view of a microscope with the optical system.

As described herein, the optical system 100 may be mounted in a microscope used for substrate inspection, such as for wafers and other semiconductor devices. FIG. 1 shows the optical system 100 in a horizontal-mounted orientation; however, other orientations can be provided. For example, FIG. 4 illustrates example portions of the optical system 100 in a vertically-mounted orientation. FIG. 5 shows an isometric view of a microscope with the optical system 100.

Figure 6:
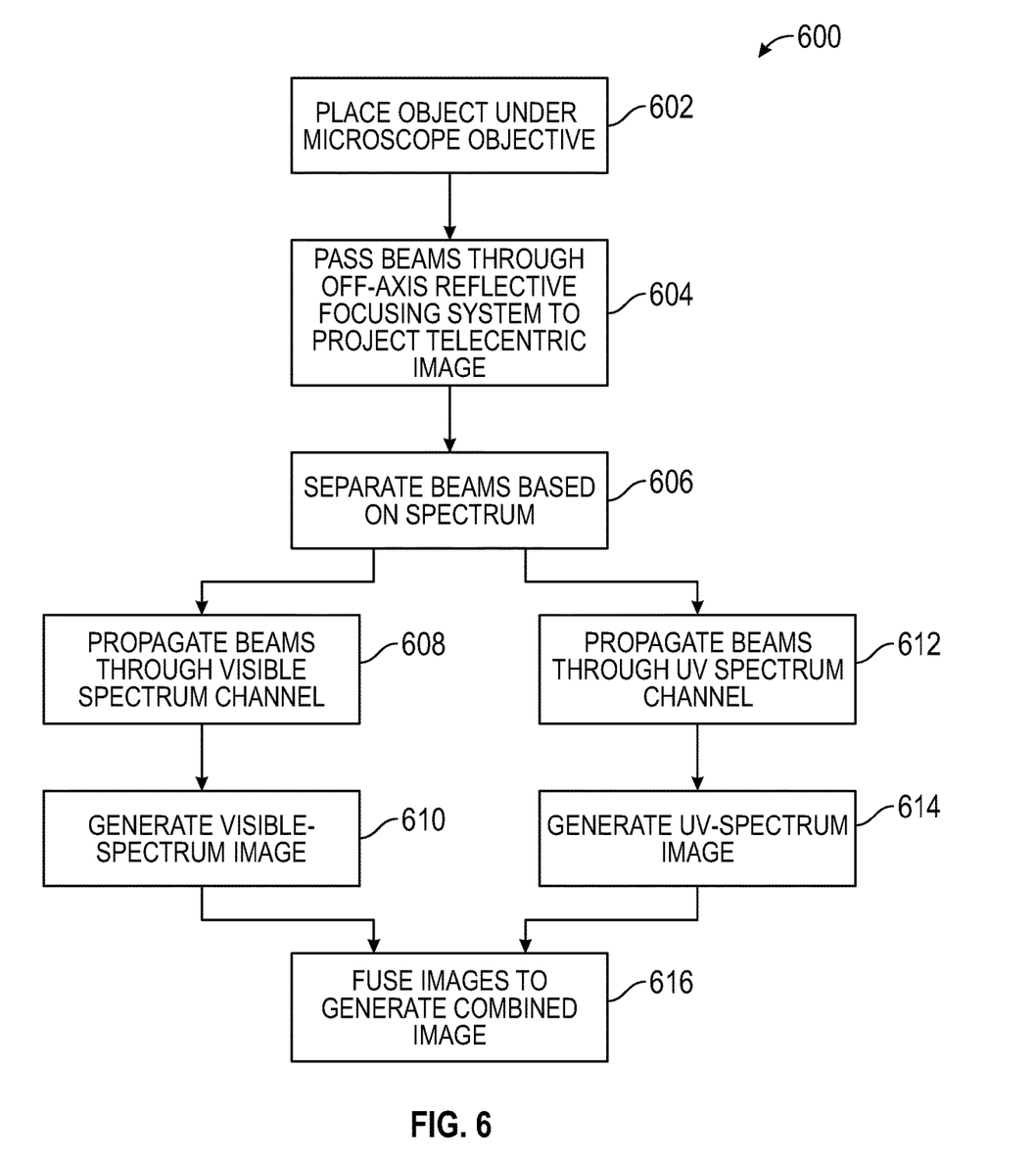
FIG. 6 is a flow diagram of a method to generate different spectrum images.

FIG. 6 is a flow diagram of a method 600 to generate visible-spectrum and UV (or DUV) images. For example, method 600 may be executed by an inspection system with the optical system 100 described herein. At step 602, an object-under-test (e.g., substrate, wafer, etc.) may be placed under a microscope objective. At step 604, the beams generated by the microscope objection representing the object-under-test may be passed through an off-axis reflective focusing system, as described herein, which may maintain telecentricity of the chief rays, e.g., projecting a telecentric image. The off-axis reflective focusing system may be used to adjust the focus of the system.

At step 606, the beams may be separated with respect to spectrum into two spectrum sets. For example, a first spectrum set may include visible wavelengths and a second spectrum set may include UV or DUV wavelengths. Other spectrums may also be used.

At step 608, the visible-spectrum beams may propagate through a visible-spectrum channel. At step 610, a visible-spectrum image may be generated using a detector/camera. At step 612, the UV-spectrum beams may propagate through a UV-spectrum channel. At step 614, a UV-spectrum image may be generated using a detector/camera. The visible-spectrum and UV-spectrum images may be generated concurrently or substantially simultaneously. In some examples, at step 616, the visible-spectrum image and the UV-spectrum image may be fused together to create a combined image in both the visible and UV spectrum. As described above, the off-axis reflective focusing system may project a telecentric image on the respective cameras in the visible-spectrum and UV-spectrum channels. Moreover, the off-axis reflective focusing system may be adjusted to control the focus of the images on the respective cameras.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspects are still deemed to fall within the scope of that aspect. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure.

The invention claimed is:

1. An optical system for inspection of a substrate, the optical system comprising:
 a microscope objective;
 an off-axis reflective focusing system comprising:
  a primary concave mirror with positive power to receive light beams from the microscope objective,
  a secondary convex mirror with negative power to receive converged light beams from the primary mirror, and
  a tertiary concave mirror with a positive power to receive redirected light beams from the secondary mirror;
 a beamsplitter to receive a light from the off-axis reflective focusing system and to separate the light into a first spectrum and a second spectrum;
 a first detector to generate a first image of the substrate based on the first spectrum; and
 a second detector to generate a second image of the substrate based on the second spectrum.

2. The optical system of claim 1, wherein the first image and the second image are generated substantially simultaneously.

3. The optical system of claim 1, wherein the first spectrum includes visible wavelengths and the second spectrum includes ultraviolet wavelengths.

4. The optical system of claim 1, wherein the primary mirror and the tertiary mirror are provided on a common surface.

5. The optical system of claim 4, where locations of the primary mirror and the tertiary mirror on the common surface are off-vertex of the common surface.

6. The optical system of claim 1, further comprising:
 a fold mirror to direct light from the off-axis reflective focusing system to the beamsplitter.

7. The optical system of claim 1, wherein the off-axis reflective focusing system to projects a telecentric image onto the first detector and the second detector.

8. The optical system of claim 1, further comprising:
 a processor to fuse the first image and the second image together to generate a composite image.

9. A method to generate images for inspecting a substrate, the method comprising:
 projecting a telecentric image of the substrate using an off-axis reflective focusing system including a primary concave mirror, a secondary convex mirror, and a tertiary concave mirror;
 separating the telecentric image into a visible spectrum and an ultraviolet spectrum;
 generating a first image based on the visible spectrum; and
 generating a second image based on the ultraviolet spectrum.

10. The method of claim 9, wherein the first image and the second image are generated substantially simultaneously.

11. The method of claim 9, further comprising:
 fusing the first image and the second image to generate a composite image.

12. The method of claim 9, wherein the primary concave mirror and the tertiary concave mirror are provided on a common surface.

13. The method of claim 12, where locations of the primary concave mirror and the tertiary concave mirror on the common surface are off-vertex of the common surface.

14. An inspection apparatus to capture images of defects on a substrate, comprising:
 an off-axis mirror based reflective focusing system with a plurality of mirrors comprising a primary concave mirror with positive power to focus and redirect the light to a secondary convex mirror, the secondary convex mirror with a negative power to redirect the light to a tertiary concave mirror;
 an objective lens to receive a light from the substrate and send the light into off-axis mirror based reflective system;
 a beamsplitter to receive a reflected light from the off-axis mirror based reflective focusing system and to separate the reflected light into a first spectrum and a second spectrum; and
 a first camera to receive the first spectrum of the reflected light from the beamsplitter and to image the defects on the substrate.

15. The inspection apparatus of claim 14, wherein the first spectrum of the reflected light is visible light and the second spectrum of the reflected light is ultraviolet light.

16. The inspection apparatus of claim 15, further comprising:
- a second camera to image the second spectrum of the reflected light; and
- a processor to fuse images by the first camera and the second camera to generate a composite image.

17. The inspection apparatus of claim 14, wherein the objective lens has an aperture stop on one end.

18. The inspection apparatus of claim 14, wherein the tertiary concave mirror to redirect the light to a fold mirror, the fold mirror to direct the light to the beamsplitter.

19. The inspection apparatus of claim 18, wherein the tertiary concave mirror has a same positive power and surface definition as the primary concave mirror, and the tertiary concave mirror and the primary concave mirror are provided on a single mirror surface.

20. The inspection apparatus of claim 14, wherein a combination of the objective lens and the off-axis mirror based reflective focusing system is configured to project a telecentric image onto the first camera.

* * * * *

UNITED STATES PATENT AND TRADEMARK OFFICE
CERTIFICATE OF CORRECTION

PATENT NO. : 12,174,128 B2
APPLICATION NO. : 17/930606
DATED : December 24, 2024
INVENTOR(S) : John A Tejada Page 1 of 1

It is certified that error appears in the above-identified patent and that said Letters Patent is hereby corrected as shown below:

In the Claims

Column number 6 Line no 21-22, "wherein the off-axis reflective focusing system to projects a telecentric image" to read as, "wherein the off-axis reflective focusing system to project a telecentric image."

Signed and Sealed this
Twenty-ninth Day of April, 2025

Coke Morgan Stewart
*Acting Director of the United States Patent and Trademark Office*